Dec. 25, 1951 D. S. WEISS 2,579,635
CAMERA TRIPOD HEAD
Filed Feb. 14, 1949
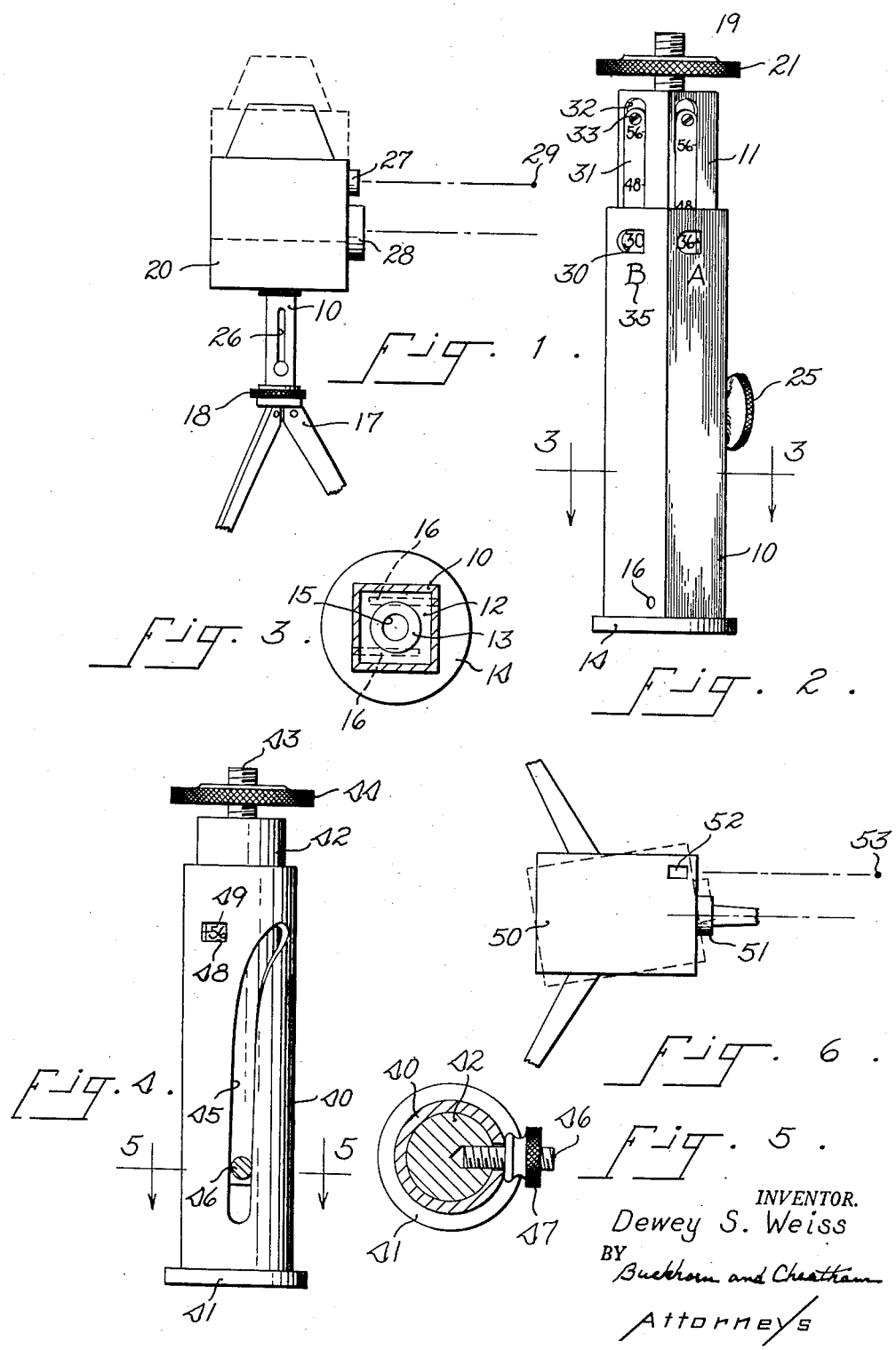
INVENTOR.
Dewey S. Weiss
BY
Buckhorn and Cheatham
Attorneys Patented Dec. 25, 1951

2,579,635

UNITED STATES PATENT OFFICE 2,579,635

CAMERA TRIPOD HEAD

Dewey S. Weiss, Portland, Oreg.

Application February 14, 1949, Serial No. 76,324

6 Claims. (Cl. 95—86)

The present invention comprises a parallax correcting mounting device for a camera whereby the usual sighting device of the camera may be employed to pose the subject and then the camera shifted to correct for the displacement of the lens from the sighting device. The invention is of particular utility in close-up work such as in taking portraits, and is designed especially for the amateur cameraman who ordinarily is incapable of correctly compensating for sighting parallax. One form of the present invention is designed to compensate for parallax between a sighting device placed directly above the lens or aperture of the camera, and another form of the device is designed to correct for both vertical and horizontal parallax due to lateral and vertical displacement of the lens or aperture from the sighting device.

A further object of the present invention is to provide a device of the character described which is made of relatively sturdy, easily assembled and manufactured parts.

The objects and advantages of the present invention will be more readily ascertained by inspection of the following specification taken in connection with the accompanying drawings wherein like numerals refer to like parts throughout, while the features of novelty will be more distinctly pointed out in the appended claims.

In the drawings Fig. 1 is a side elevation of a camera mounted on a device of the present invention and illustrating the operation thereof to correct vertical parallax;

Fig. 2 is an elevation, on an enlarged scale, of the form of the invention illustrated in Fig. 1;

Fig. 3 is a horizontal section taken substantially along line 3—3 of Fig. 2;

Fig. 4 is a view in elevation, with a part broken away, of a modification of the device designed to correct for both horizontal and vertical parallax;

Fig. 5 is a vertical section taken substantially along line 5—5 of Fig. 4; and

Fig. 6 is a plan view of a camera mounted on the form of the device illustrated in Fig. 4, the view showing the operation of the device.

Referring to Figs. 1, 2 and 3, my invention comprises a pair of elongated, telescoping elements including a base member 10 adapted to be mounted upon a support such as a tripod, and an extension member 11 adapted to be attached to and support a camera. The base member 10 preferably comprises an outer, hollow member formed of square, tubular stock, the lower end thereof being closed by a rectangular plug 12 into which is screwed the threaded stem 13 of a member 14 having a disclike head thereon, the stem 13 being provided with an internally threaded opening 15 capable of receiving therein the usual mounting screw found on tripods or similar camera mounts. Although the base member 10 could be made of one integral piece of material, I prefer to form the base member of the three parts 10, 12 and 14 and to hold the parts in assembled relation by suitable means such as drift pins 16. It will readily be appreciated that the base member may be mounted upon a tripod 17, such as illustrated in Fig. 1, and locked in position by the usual jam nut 18 provided on such mounting devices. The inner, telescoping member 11 may be formed of rectangular bar stock and is provided with an upwardly extending, threaded portion 19 adapted to be screwed into the bottom of a camera such as camera 20, the extension being locked to the base of the camera by a jam nut 21. The extensible members may be held in any selected, relatively adjusted position by suitable means such as a thumbscrew 25 having a threaded stem passing through a vertical slot 26 in one side of the base member 10 into a threaded hole (not shown) in the extension member 11.

When a camera such as shown in Fig. 2, provided with a sighting device 27 which is vertically spaced above the lens 28, is in the position illustrated in full line, the photographer may align the camera with an object to be photographed at 29, and thereafter the telescoping members may be separated until the objective line through the lens 28 more nearly approaches the line of sight through the sighting device. It will be appreciated that at infinity the view through the sighting device will be the same as the view through the lens. At distances progressively shorter than infinity the camera should be raised amounts progressively increasing in extent and, in order that the unskilled photographer may correctly position the camera, indicating means are preferably provided. In the preferred form the indicating means comprises a window such as window 30 in one face of the member 10 and a scale such as scale 31 on the adjacent face of the extension 11, the scale being provided with indicia representative of the distance between the camera and the object being photographed. The indicia could be inscribed upon the member 11, but I prefer to provide a separate scale having the indicia inscribed thereon which is adapted to be retained in a groove 32 in the face of member 11 by separable means such as screws 33. The indicia in either event are so located as to be visible in succession through the window 30. As seen in Fig. 2, more than one of the faces of member 11 are provided with indicia and more than one of the faces of the base member 10 are provided with windows past which the indicia may be moved. Therefore, the device may be used by a photographer having a plurality of cameras, each of which must be adjusted to different extents. Having the scales 31 removable and replaceable further adapts the device to use with a wide range of cameras. In order that the photographer may have a reminder as to which scale to employ for the particular camera, one of the members may be provided with indicia 35 which represent the particular cameras for which the scales 31 are provided.

Figs. 4, 5 and 6 illustrate a modification of the present invention wherein a base member 40 is provided by mounting a plug 41 adapted to be attached to a tripod in the lower end of a cylinder. An extension member 42 is telescopically mounted within the base member, and is provided with a threaded, reduced portion 43 adapted to be screwed into the base of a camera, the mounting device and the camera being locked together by the jam nut 44. The base member is provided with a slot 45 through which extends a threaded pin 46 on which is a thumbnut 47. A window 48 is provided in the base member and a plurality of distance-representing indicia 49 are inscribed upon the extension member 42 in position to move successively past the window as the members are relatively moved.

This form of the device is designed particularly for use in correcting both horizontal and vertical parallax for a camera such as seen in Fig. 5 wherein the camera 50 is provided with a lens 51 and a vertically and horizontally displaced sighting device 52. When employing a camera of this character with the mounting device shown in Fig. 4, the photographer may sight at an object 53 through the sighting device and thereupon may elevate the camera until one of the indicia 49, representing the distance between the camera and the object, appears in window 48. The slot 45 is so arranged as to partially rotate the extension 42 and the camera 50 as the members are separated. The greater the distance between the camera and the object, the less correction, both vertically and horizontally, is required, so the slot 45 may be vertical, or substantially so, adjacent the base of the mounting member. The closer the object the greater the correction must be, both horizontally and vertically, and, accordingly, the slot is increasingly curved toward its upper extremity. With an object close to the camera, as seen in Fig. 5, the camera is not only raised to nearly the maximum extent permitted but is rotated through a substantial arc to the position seen in dash lines.

While I have hereinabove referred to the correction of parallax at any distance shorter than infinity, it is to be appreciated that the present invention is primarily designed for close-ups and portraits, since at any distance beyond about six feet the necessity for making parallax corrections practically disappears. Modern cameras are designed with this fact in mind, hence the viewfinder is so arranged as to encompass a field of view coincident with the field of the lens at a distance of about six feet. However, at any distance shorter than about six feet some correction must be made for parallax, this correction increasing progressively as the distance between the lens and the object progressively decreases. Because of the corrective factor of viewfinders in modern cameras it is not sufficient to shift the camera vertically or horizontally by a distance equal to the distance between the lens and the viewfinder, but the correction must be in proportion to the distance to the object. The cameras of each manufacturer, and various different styles of cameras of one manufacturer, will have different corrections incorporated therein so that it becomes necessary to ascertain the degree of correction required for each of a plurality of distances from the camera up to substantially six feet, and to provide an indicia-bearing scale or separate mount for each individual camera.

I have herein illustrated clamping means such as a thumbscrew having a threaded stem, or a pin projecting from the extensible member and having its outer extremity threaded for reception of a thumbnut, but other forms of clamping means could be substituted therefor. Similarly, other forms of indicating means may be employed, and other modifications in arrangement and detail should be apparent to those skilled in the art. I claim as my invention all such modifications as come within the true spirit and scope of the appended claims.

I claim:

1. A mounting device for supporting a camera in such fashion that vertical and horizontal parallax between the camera sighting device and the lens of the camera may be corrected, comprising a pair of elongated, telescoping members, each projecting beyond the other, one of said members having an indicator thereon and the other of said members having a plurality of indicia thereon adapted to register successively with said indicator as said members are shifted longitudinally relative to each other, said members being relatively rotatable, one of said members having a guideway formed thereon, said guideway curving spirally at an increased rate toward the end from which the other of said members projects, and the other of said members having a pin thereon projecting into said guideway to rotate said members relative to each other as they are shifted longitudinally relative to each other.

2. Parallax correcting means for mounting a camera comprising a pair of elongated, telescoping, relatively rotatable members, one of which is adapted to be mounted in an upright position upon a support such as a tripod and the other of which is adapted to be attached to a camera, an indicator on one of said members, a plurality of distance-representing indicia on the other of said members in positon to register with said indicator as said members are shifted relative to each other, and means to retain said members in any selected relative position, one of said members having a guideway formed thereon, said guideway being substantially parallel to the axis of the member at one end and curving spirally toward its other end, and the other of said members having a pin thereon projecting into said guideway to rotate said members relative to each other as they are shifted longitudinally relative to each other.

3. Parallax correcting means for mounting a camera, comprising a pair of elongated, telescoping, relatively rotatable members, each projecting beyond the other, one of which is adapted to be mounted in an upright position upon a support and the other of which is adapted to support a camera, one of said members having a slot therethrough extending generally parallel to the longitudinal axis thereof, said slot being spirally curved at a progressively increasing rate toward the end from which the other of said members projects, and a thumbscrew extending through said slot for guiding and clamping said members together.

4. A mounting device for supporting a camera having a sighting device offset both vertically and horizontally from its lens in such fashion that the vertical and horizontal parallax between the camera sighting device and the lens of the camera may be simultaneously corrected, comprising an outer, tubular member adapted to be supported in upright position and being open at the end which is uppermost when so supported, a cylindrical member slidably movable longitudinally of said tubular member and having an end projecting from the open end of said tubular member, means at the projecting end of said cylindrical member for supporting a camera, said outer member having a longitudinally extending slot therethrough which is curved laterally at an increasing rate from the lower end thereof toward said open end, a guide pin projecting from said cylindrical member through said slot, and means to retain said members in any selected position relative to each other, said tubular member having a window opening therein adjacent its upper end and said cylindrical member having a plurality of distance-representing indicia thereon successively visible through said opening as said members are relatively moved, the curvature of said slot being such as to rotate said camera to correct horizontal parallax as said camera is raised to correct vertical parallax.

5. A mounting device for supporting a camera having a sighting device offset both vertically and horizontally from its lens in such fashion that the vertical and horizontal parallax between the camera sighting device and the lens of the camera may be simultaneously corrected, comprising an elongated member adapted to be supported in upright position and having a vertical bore therein open at the end which is uppermost when so supported, a cylindrical member slidably movable longitudinally of said tubular member and having an end projecting from the open end of said bore, means at the projecting end of said cylindrical member for supporting a camera, one of said members having a longitudinally extending guideway thereon which is curved laterally at an increasing rate from one end thereof toward the opposite end thereof, a guide pin projecting from the other of said members into said guideway, and means to retain said members in any selected position relative to each other, the curvature of said guideway being such as to rotate said camera to correct horizontal parallax as said camera is raised to correct vertical parallax.

6. A mounting device for supporting a camera having a sighting device offset both vertically and horizontally from its lens in such fashion that the vertical and horizontal parallax between the camera sighting device and the lens of the camera may be simultaneously corrected, comprising an elongated member adapted to be supported in upright position and having a vertical bore therein open at the end which is uppermost when the member is so supported, a cylindrical member slidably movable longitudinally of said elongated member and having an end projecting from the open end of said bore, means at the projecting end of said cylindrical member for supporting a camera, one of said members having a longitudinally extending guideway thereon which is curved laterally at an increasing rate from one end thereof toward the opposite end, a guide pin projecting from the other of said members into said guideway, and means to retain said members in any selected position relative to each other, said elongated member having a window opening therein and said cylindrical member having a plurality of distance representing indicia thereon successively visible through said opening as said members are relatively moved, the curvature of said guideway being such as to rotate said camera to correct horizontal parallax as said camera is raised to correct vertical parallax, said indicia representing distance to the object being photographed but covering a space corresponding to the spacing of the lens and the finder of a particular camera, and said indicia being so arranged that the placing of any one of said indicia corresponding to the distance to the object being photographed in registry with said window opening results in displacement of the camera by the amount necessary to correct vertical and horizontal parallax.

DEWEY S. WEISS.

REFERENCES CITED

The following references are of record in the file of this patent:

UNITED STATES PATENTS

| Number | Name | Date |
| --- | --- | --- |
| 2,361,183 | Eddy | Oct. 24, 1944 |
| 2,380,818 | Berg | July 31, 1945 |
| 2,465,692 | Martinson | Mar. 29, 1949 |

FOREIGN PATENTS

| Number | Country | Date |
| --- | --- | --- |
| 609,962 | Germany | Mar. 5, 1935 |